United States Patent
Randall et al.

(10) Patent No.: US 6,214,786 B1
(45) Date of Patent: Apr. 10, 2001

(54) LAUNDRY DETERGENT COMPOSITIONS WITH AMINO ACID BASED POLYMERS TO PROVIDE APPEARANCE AND INTEGRITY BENEFITS TO FABRICS LAUNDERED THEREWITH

(75) Inventors: Sherri Lynn Randall, Hamilton; Rajan Keshav Panandiker, West Chester; Eugene Paul Gosselink; LeeAnn Luipold, both of Cincinnati, all of OH (US); Bernhard Mohr, Schwabisch Hall (DE); Dieter Boeckh, Limburgerhof (DE); Ralf Norenberg, Frankfurt (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/485,248

(22) PCT Filed: Aug. 7, 1998

(86) PCT No.: PCT/US98/16495

§ 371 Date: Feb. 7, 2000

§ 102(e) Date: Feb. 7, 2000

(87) PCT Pub. No.: WO99/07813

PCT Pub. Date: Feb. 18, 1999

Related U.S. Application Data

(60) Provisional application No. 60/055,152, filed on Aug. 8, 1997.

(51) Int. Cl.[7] .................................. C11D 3/30; C11D 3/37
(52) U.S. Cl. .......................... 510/499; 510/276; 510/319; 510/382; 510/480; 510/332
(58) Field of Search ...................................... 510/276, 319, 510/382, 480, 499, 332

(56) References Cited

U.S. PATENT DOCUMENTS

| | | | |
|---|---|---|---|
| 5,028,689 | 7/1991 | Heinz et al. | 528/328 |
| 5,540,863 | * 7/1996 | Wood et al. | 510/356 |
| 5,639,723 | * 6/1997 | Kroner et al. | 510/476 |
| 5,714,447 | * 2/1998 | Jones et al. | 510/131 |

FOREIGN PATENT DOCUMENTS

| | | | | |
|---|---|---|---|---|
| 454126 | * 10/1991 | (EP) | . | |
| 0 454 126 A1 | 10/1991 | (EP) | | C11D/3/37 |
| 7166200 | * 6/1995 | (JP) | . | |
| 9176689 | * 7/1997 | (JP) | . | |
| WO 94/01486 | 1/1994 | (WO) | | C08G/69/10 |
| WO 94/24254 | 10/1994 | (WO) | | C11D/3/37 |
| 95/09638 | * 4/1995 | (WO) | . | |
| WO 95/09638 | 4/1995 | (WO) | | A61K/31/785 |

* cited by examiner

*Primary Examiner*—Yogendra Gupta
*Assistant Examiner*—Charles Boyer
(74) *Attorney, Agent, or Firm*—Marianne Dressman; Kim William Zerby; Steven W. Miller

(57) ABSTRACT

Compositions than contain from about 1% to about 80% by weight of surfactants selected from the group consisting of nonionic, anionic, cationic, amphoteric or zwitteronic surfactants, or mixtures thereof; and from about 0.1% to about 10%, by weight of a mixture of amino acid based polymers, oligomers or copolymers of the general formula (I) wherein the polymer, oligomer, or copolymer contains at least about 5 mole % of one or more amino acids and an organic acid are disclosed. The compositions are useful as fabric treatment agents as they can impart fabric appearance and integrity benefits to fabrics.

14 Claims, No Drawings

LAUNDRY DETERGENT COMPOSITIONS WITH AMINO ACID BASED POLYMERS TO PROVIDE APPEARANCE AND INTEGRITY BENEFITS TO FABRICS LAUNDERED THEREWITH

This application claims the benefit of U.S. Provisional application No. 60/055152 filed Aug. 8, 1997.

TECHNICAL FIELD

The present invention relates to compositions, in either liquid or granular form, for use in laundry applications, wherein the compositions comprise certain amino acid based polymer, oligomer or copolymer materials which impart appearance and integrity benefits to fabrics and textiles laundered in washing solutions formed from such compositions.

BACKGROUND OF THE INVENTION

It is, of course, well known that alternating cycles of using and laundering fabrics and textiles, such as articles of worn clothing and apparel, will inevitably adversely affect the appearance and integrity of the fabric and textile items so used and laundered. Fabrics and textiles simply wear out over time and with use. Laundering of fabrics and textiles is necessary to remove soils and stains which accumulate therein and thereon during ordinary use. However, the laundering operation itself, over many cycles, can accentuate and contribute to the deterioration of the integrity and the appearance of such fabrics and textiles.

Deterioration of fabric integrity and appearance can manifest itself in several ways. Short fibers are dislodged from woven and knit fabric/textile structures by the mechanical action of laundering. These dislodged fibers may form lint, fuzz or "pills" which are visible on the surface of fabrics and diminish the appearance of newness of the fabric. Further, repeated laundering of fabrics and textiles, especially with bleach-containing laundry products, can remove dye from fabrics and textiles and impart a faded, worn out appearance as a result of diminished color intensity, and in many cases, as a result of changes in hues or shades of color.

Given the foregoing, there is clearly an ongoing need to identify materials which could be added to laundry detergent products that would associate themselves with the fibers of the fabrics and textiles laundered using such detergent products and thereby reduce or minimize the tendency of the laundered fabric/textiles to deteriorate in appearance. Any such detergent product additive material should, of course, be able to benefit fabric appearance and integrity without unduly interfering with the ability of the laundry detergent to perform its fabric cleaning function. The present invention is directed to the use of amino acid based polymer, oligomer or copolymer materials in laundry applications which perform in this desired manner.

SUMMARY OF THE INVENTION

Amino acid based polymer, oligomer or copolymer materials which are suitable for use in laundry operations and provide the desired fabric appearance and integrity benefits can be characterized by the following general formula:

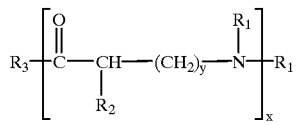

wherein the polymer, oligomer, or copolymer contains at least about 5 mole %, preferably at least about 10 mole %, more preferably from about 20 mole %, and most preferably at least about 40 mole %, of one or more basic amino acids; each $R_1$ is independently selected from the group consisting of H, —C(O)—$R_4$, $C_{1-C18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl, $C_7$–$C_{18}$ alkylaryl, citric acid,

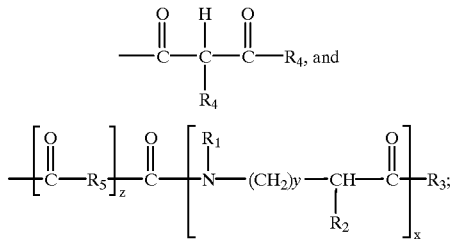

each $R_2$ is independently selected from the group consisting of H, $NH_2$,

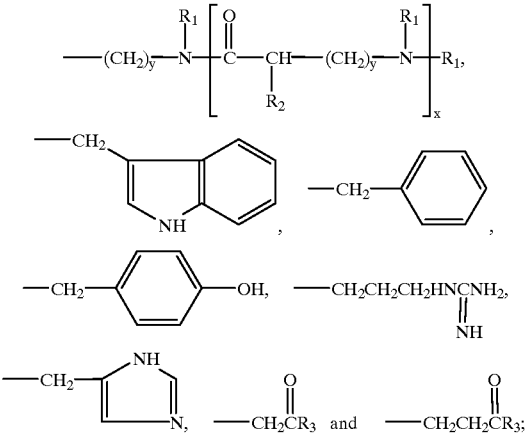

each $R_3$ is independently selected from the group consisting of OH, OM,

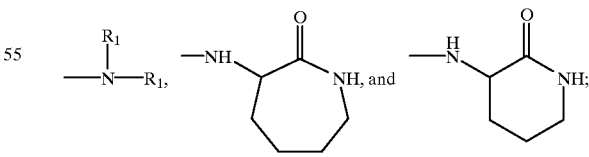

each $R_4$ is independently selected from the group consisting of $C_1$–$C_{30}$ saturated or unsaturated, branched or linear alkyl, $C_3$–$C_8$ cycloalkyl, $C_2$–$C_{30}$ hydroxyalkyl, $C_6$–$C_{18}$ aryl, $C_7$–$C_{30}$ alkylaryl, and $C_2$–$C_{100}$ linear or branched oxa or polyoxa-substituted alkyl;

$R_5$ may be absent, if $R_5$ is present each $R_5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, and $C_3$–$C_{12}$ cyclic oxa-substituted alkylene; wherein:

each x is independently from 0 to about 200;

each y is independently from 0 to about 10, preferably y is 0, 3 or 4, and most preferably y is 4;

each z is independently 0 or 1; and

M is selected from compatible cations; and provided that:

the sum of all x's is from 2 to about 200, preferably from about 3 to about 150, more preferably from about 5 to about 120, and most preferably from about 5 to about 100;

any basic amine site on the polymer, oligomer, or copolymer may be optionally protonated, alkylated, or quaternized with constituents selected from the group consisting of H, $CH_3$, alkyl, hydroxyalkyl, benzyl and mixtures thereof;

any amine site may be optionally alkoxylated; and when two $R_1$ groups are attached to a common nitrogen the two $R_1$s may form a cyclic structure selected from the group consisting of $C_5$–$C_8$ alkylene, and $C_4$–$C_7$ alkyleneoxyalkylene.

In one aspect of this invention there is provided a detergent composition comprising:

a) from about 1% to about 80% by weight of surfactants selected from the group consisting of nonionic, anionic, cationic, amphoteric, or zwitterionic surfactants, or mixtures thereof; and b) from about 0.1% to about 10%, preferably from about 0.2% to about 8%, more preferably from about 0.3% to about 6%, and most preferably from about 0.4% to about 5%, by weight of a mixture of amino acid based polymers which are obtainable by condensing at a temperature of at least 120° C.:

(i) a basic amino acid selected from the group consisting of lysine, arginine, ornithine, tryptophane and mixtures thereof;

(ii) a copolymerizable compound selected from the group consisting of saturated monobasic carboxylic acids, unsaturated monobasic carboxylic acids, polybasic carboxylic acids, carboxylic acid anhydrides, diketenes, monohydroxycarboxylic acids, monobasic polyhydroxycarboxylic acids and mixtures thereof; and (iii) optionally, at least one compound selected from the group consisting of amines, lactams, nonproteinogenic acids, alcohols, alkoxylated amines, amino sugars, carbohydrates, sugar carboxylic acids and mixtures thereof; and wherein compounds (i) and (ii) are present in a molar ratio of (i):(ii) of from 100:1 to 1:1, preferably the molar ratio of basic amino acid (i) to copolymerizable compound (ii) is of from 100:1 to 2:1, more preferably the molar ratio of basic amino acid (i) to copolymerizable compound (ii) is of from 50:1 to 2:1, and most preferably the molar ratio of basic amino acid (i) to copolymerizable compound (ii) is of from 20:1 to 5:1. The molar ratio of compounds (i):(iii) is preferably from 100:1 to 1:20.

The amino acid based polymer, oligomer or copolymer materials defined above can be used as a washing solution additive in either granular or liquid form. Alternatively, they can be admixed to granular detergents, dissolved in liquid detergent compositions or added to a fabric softening composition. Preferably the fabric treatment compositions of this invention comprise from about 0.1% to about 10%, preferably from about 0.2% to about 8%, more preferably from about 0.3% to about 6%, and most preferably from about 0.4% to about 5%, by weight of a mixture of the amino acid based polymers, oligomers or copolymers defiened by the general formula above. The forgoing description of uses for the amino acid based fabric treatment materials defined herein are intended to be exemplary and other uses will be apparent to those skilled in the art and are intended to be within the scope of the present invention.

The laundry detergent compositions herein comprise from about 1% to 80% by weight of a detersive surfactant, from about 0.1% to 80% by weight of an organic or inorganic detergency builder and from about 0.1% to 5% by weight of the amino acid based fabric treatment materials of the present invention. The detersive surfactant and detergency builder materials can be any of those useful in conventional laundry detergent products.

Aqueous solutions of the amino acid based polymer, oligomer or copolymer materials of the subject invention comprise from about 0.1% to 50% by weight of the amino acid based fabric treatment materials dissolved in water and other ingredients such as stabilizers and pH adjusters.

In its method aspect, the present invention relates to the laundering or treating of fabrics and textiles in aqueous washing or treating solutions formed from effective amounts of the detergent compositions described herein, or formed from the individual components of such compositions. Laundering of fabrics and textiles in such washing solutions, followed by rinsing and drying, imparts fabric appearance benefits to the fabric and textile articles so treated. Such benefits can include improved overall appearance, pill/fuzz reduction, antifading, improved abrasion resistance, and/or enhanced softness.

DETAILED DESCRIPTION OF THE INVENTION

As noted, when fabric or textiles are laundered in wash solutions which comprise the amino acid based polymer, oligomer or copolymer materials of the present invention fabric appearance and integrity are enhanced. The amino acid based fabric treatment materials can be added to wash solutions by incorporating them into a detergent composition, a fabric softener or by adding them separately to the washing solution. The amino acid based fabric treatment materials are described herein primarily as liquid or granular detergent additives but the present invention is not meant to be so limited. The amino acid based fabric treatment materials, detergent composition components, optional ingredients for such compositions and methods of using such compositions, are described in detail below. All percentages are by weight unless other specified.

A) Amino Acid Based Polymer, Oligomer or Copolymer Materials

The essential component of the compositions of the present invention comprises one or more amino acid based polymer, oligomer or copolymer. Such materials have been found to impart a number of appearance benefits to fabrics and textiles laundered in aqueous washing solutions formed from detergent compositions which contain such amino acid based fabric treatment materials. Such fabric appearance benefits can include, for example, improved overall appearance of the laundered fabrics, reduction of the formation of pills and fuzz, protection against color fading, improved abrasion resistance, etc. The amino acid based fabric treatment materials used in the compositions and methods herein can provide such fabric appearance benefits with acceptably little or no loss in cleaning performance provided by the laundry detergent compositions into which such materials are incorporated.

One preferred method for making the amino acid based polymers, oligomers or copolymers of this invention is by a condensation reaction of an amino acid and another group such as a carboxylic acid. Condensation reactions are known to those skilled in the art, and the compositions and parameters for exemplary reactions are given in the Examples below. Preferred condensates according to this invention include the condensate reaction product of lysine with at least one acid selected from the group consisting of aminocaproic acid, caprolactam, 2-ethylhexanoic acid, adipic acid, phthalic acid, terephthalic acid, oxalic acid, citric acid, $C_1$–$C_{30}$ alkyldiketenes, $C_1$–$C_{30}$ monocarboxylic acids that are linear or branched, saturated or unsaturated, and mixtures thereof. Preferably, the lysine and the acid are condensed at a ratio of lysine:acid of from about 1:1 to about 10:1. Additionally, lysine or other amino acids can be condensed with a combination of two or more acids selected from the group consisting of aminocaproic acid, caprolactam, 2-ethylhexanoic acid, adipic acid, phthalic acid, terephthalic acid, oxalic acid, citric acid, $C_1$–$C_{30}$ alkyldiketenes, $C_1$–$C_{30}$ monocarboxylic acids that are linear or branched, saturated or unsaturated, and mixtures thereof.

The amino acid based polymer, oligomer or copolymer component of the compositions herein may also comprise combinations of these amino acid based materials. For example, a mixture of lysine and adipic acid condensates can be combined with a mixture of lysine and lauric acid condensates to achieve the desired fabric treatment results. Moreover, the molecular weight of amino acid based fabric treatment materials can vary within the mixture as is illustrated in Example I below.

As will be apparent to those skilled in the art, an oligomer is a molecule consisting of only a few monomer units while polymers comprise considerably more monomer units. For the present invention, oligomers are defined as molecules having an average molecular weight below about 1,000 and polymers are molecules having an average molecular weight of greater than about 1,000. Copolymers are polymers or oligomers wherein two or more dissimilar monomers have been simultaneously or sequentially polymerized. Copolymers of the present invention can include, for example, polymers or oligomers polymerized from a mixture of a primary amino acid based monomer, e.g., lysine, and a secondary amino acid monomer, e.g., tryptophan.

The amino acid based fabric treatment component of the detergent compositions herein will generally comprise from about 0.1% to about 10%, preferably from about 0.2% to about 8%, more preferably from about 0.3% to about 6%, and most preferably from about 0.4% to about 5%, by weight of a mixture of the amino acid based polymers, oligomers or copolymers defined by the general formula below. But when used as a washing solution additive, i.e. when the amino acid based fabric treatment component is not incorporated into a detergent composition, the concentration of the amino acid based component can comprise from about 0.1% to about 50% by weight of the additive material.

One suitable group of amino acid based polymer, oligomer or copolymer materials for use herein is characterized by the following formula:

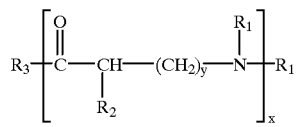

wherein the polymer, oligomer, or copolymer contains at least about 5 mole %, preferably at least about 10 mole %, more preferably from about 20 mole %, and most preferably at least about 40 mole %, of one or more basic amino acids; each $R_1$ is independently selected from the group consisting of H, —C(O)—$R_4$, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl, $C_7$–$C_{18}$ alkylaryl, citric acid,

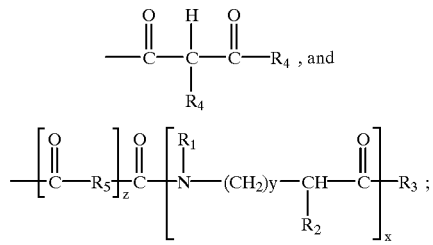

each $R_2$ is independently selected from the group consisting of H, $NH_2$,

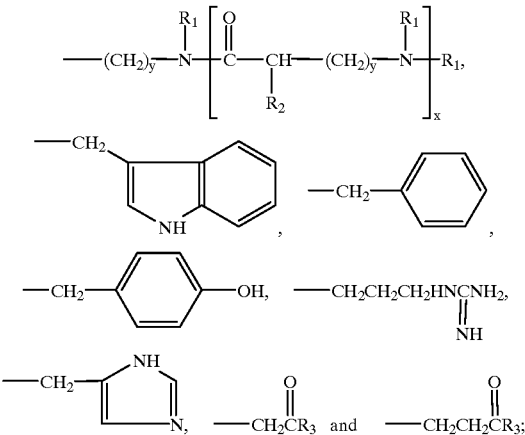

each $R_3$ is independently selected from the group consisting of OH, OM,

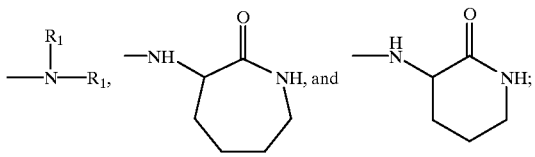

each $R_4$ is independently selected from the group consisting of $C_1$–$C_{30}$ saturated or unsaturated, branched or linear alkyl, $C_3$–$C_8$ cycloalkyl, $C_2$–$C_{30}$ hydroxyalkyl, $C_6$–$C_{18}$ aryl, $C_7$–$C_{30}$ alkylaryl, and $C_2$–$C_{100}$ linear or branched oxa or polyoxa-substituted alkyl;

$R_5$ may be absent, if $R_5$ is present each $R_5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, and $C_3$–$C_{12}$ cyclic oxa-substituted alkylene;
wherein:
each x is independently from 0 to about 200;
each y is independently from 0 to about 10;
each z is independently 0 or 1; and
M is selected from compatible cations; and provided that:
  the sum of all x's is from 2 to about 200, preferably from about 3 to about 150, more preferably from about 5 to about 120, and most preferably from about 5 to about 100;
  any basic amine site on the polymer, oligomer, or copolymer may be optionally protonated, alkylated, or quaternized with constituents selected from the group consisting of H, $CH_3$, alkyl, hydroxyalkyl, benzyl and mixtures thereof;
  any amine site may be optionally alkoxylated; and
  when two $R_1$ groups are attached to a common nitrogen the two $R_1$s may form a cyclic structure selected from the group consisting of $C_5$–$C_8$ alkylene, and $C_4$–$C_7$ alkyleneoxyalkylene.
Preferably, no nitrogen in the structure defined above has more then one acyl group directly attached to it. By "basic" amino acid it is intended that the amino acid should have a reactive nitrogen cite after polymerization. Basic amino acids include lysine, arginine, histidine, tryptophane and orinthine.

In one aspect of this invention there is provided a detergent composition comprising:
a) from about 1% to about 80% by weight of surfactants selected from the group consisting of nonionic, anionic, cationic, amphoteric, or zwitterionic surfactants, or mixtures thereof; and
b) from about 0.1% to about 10%, preferably from about 0.2% to about 8%, more preferably from about 0.3% to about 6%, and most preferably from about 0.4% to about 5%, by weight of a mixture of amino acid based polymers which are obtainable by condensing at a temperature of at least 120° C.:
  (i) a basic amino acid selected from the group consisting of lysine, arginine, ornithine, tryptophane and mixtures thereof;
  (ii) a copolymerizable compound selected from the group consisting of saturated monobasic carboxylic acids, unsaturated monobasic carboxylic acids, polybasic carboxylic acids, carboxylic acid anhydrides, diketenes, monohydroxycarboxylic acids, monobasic polyhydroxycarboxylic acids and mixtures thereof; and
  (iii) optionally, at least one compound selected from the group consisting of amines, lactams, preferably, lactams having 5 to 13 atoms in the ring, nonproteinogenic acids, alcohols, alkoxylated amines, amino sugars, carbohydrates, sugar carboxylic acids and mixtures thereof; and
wherein compounds (i) and (ii) are present in a molar ratio of (i):(ii) of from 100:1 to 1:1, preferably the molar ratio of basic amino acid (i) to copolymerizable compound (ii) is of from 100:1 to 2:1, more preferably the molar ratio of basic amino acid (i) to copolymerizable compound (ii) is of from 50:1 to 2:1, and most preferably the molar ratio of basic amino acid (i) to copolymerizable compound (ii) is of from 20:1 to 5:1. The molar ratio of compounds (i):(iii) is preferably from 100:1 to 1:20.

Preferably the detergent compositions of this invention comprise amino acid based polymers that are obtained by condensing lysine, and at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof. Even more preferably, the copolymerizable compound, (ii), comprises at least one alkyldiketene having 1 to 30 carbon atoms in the alkyl group.

More Specificaly, The copolymerizable compounds (ii) are selected from the group consisting of saturated monobasic carboxylic acids, unsaturated monobasic carboxylic acids, polybasic carboxylic acids, carboxylic acid anhydrides, diketenes, monohydroxycarboxylic acids, monobasic polyhydroxycarboxylic acids and mixtures thereof. Examples of saturated monobasic carboxylic acids are formic acid, acetic acid, propionic acid, butyric acid, valeric acid, capric acid, lauric acid, palmitic acid, stearic acid, arachidic acid, behenic acid, myristic acid, undecanoic acid, 2-ethyl hexanoic acid, and all naturally occurring fatty acids and mixtures thereof.

Examples of unsaturated monobasic carboxylic acids are acrylic acid, methacrylic acid, crotonic acid, sorbic acid, oleic acid, linoleic acid, and erucic acid. Examples of polybasic carboxylic acids are oxalic acid, fumaric acid, maleic acid, malonic acid, succinic acid, itaconic acid, adipic acid, aconitic acid, suberic acid, azeleic acid, pyridinedicarboxylic acid, furandicarboxylic acid, phthalic acid, tarephthalic acid, digylcolic acid, glutaric acid, substituted $C_4$-dicarboxylic acid, sulfosuccinic acid, $C_1$- to $C_{26}$-alkylsuccinic acids, $C_2$- to $C_{26}$-alkenylsuccinic acids, 1, 2, 3-propanetricarboxylic acids, 1, 1, 3, 3-propanetetracarboxylic acids, 1,1,2,2-ethanetetracarboxylic acid, 1,2,3,4-butanetetracarboxylic acid, 1,2,2,3-propanetetracarboxylic acid, 1,3,3,5-pentanetetracarboxylic acid, 1,2,4-benzenetricarboxylic acid, and 1,2,4,5-benzenetetracarboxylic acid. Polybasic carboxylic acids which can form carboxylic anhydrides are also suitable as compounds (b), for example succinic anhydride, mono and dianhydride of butanetetracarboxylic acid, phthalic anhydride, acetylcitric anhydride, maleic anhydride, itaconic anhydride, and aconitic anhydride.

Examples of diketenes which may be used as component (b) are alkyl diketenes having 1 to 30 carbon atoms. These diketenes may be characterized by the following formula:

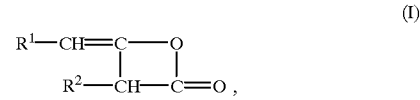

(I)

wherein the substituents $R^1$ and $R^2$ have the same meaning or are different $C_1$- to $C_{30}$-, preferably $C_6$- to $C_{22}$- saturated or ethylenically unsaturated alkyl. Compounds of formula (I) are for example hexyl diketene, cyclohexyl diketene, octyl diketene, decyl diketene, dodecyldiketene, palmityl diketene, stearyl diketene, oleyl diketene, ocatdecyl diketene, eicosyl diketene, docosyl diketene, and behenyl diketene.

Examples of monohydroxycarboxylic acids are malic acid, tartronic acid, citric acid, and isocitric acid. Polyhydroxycarboxylic acids are for example tartaric acid, mucic acid, glyceric acid, bis (hydroxymethyl) propinonic acid, gluconic acid, and hydroxylated unsaturated fatty acids such as dihydroxystearic acid.

In the Example section below, specific condensation reaction parameters are disclosed. In light of these examples, the specific details regarding the condensation reaction of an amino acid and an organic acid will be apparent to those skilled in the art.

B) Detersive Surfactant

The detergent compositions herein comprise from about 1% to 80% by weight of a detersive surfactant. Preferably such compositions comprise from about 5% to 50% by weight of surfactant. Detersive surfactants utilized can be of the anionic, nonionic, zwitterionic, ampholytic or cationic type or can comprise compatible mixtures of these types. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. All of these patents are incorporated herein by reference. Of all the surfactants, anionics and nonionics are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ammonium alkyl sulfates, especially those obtained by sulfating the higher alcohols ($C_8$–$C_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the all group is from about 11 to 13, abbreviated as $C_{11-13}$ LAS.

Preferred nonionic surfactants are those of the formula $R_1(OC_2H_4)_nOH$, wherein $R_1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$Cl_{13}$ alcohol condensed with about 6.5 moles of ethylene oxide per mole of alcohol.

Additional suitable nonionic surfactants include polyhydroxy fatty acid amides of the formula:

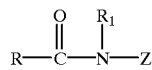

wherein R is a $C_{9-17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798, the disclosures of which are incorporated herein by reference.

Preferred surfactants for use in the detergent compositions described herein are amine based surfactants of the general formula:

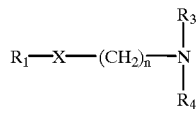

wherein $R_1$ is a $C_6$–$C_{12}$ alkyl group; n is from about 2 to about 4, X is a bridging group which is selected from NH, CONH, COO, or O or X can be absent; and $R_3$ and $R_4$ are individually selected from H, $C_1$–$C_4$ alkyl, or ($CH_2$—$CH_2$—$O(R_5)$) wherein $R_5$ is H or methyl. Especially preferred amines based surfactants include the following:

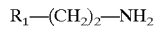

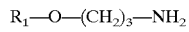

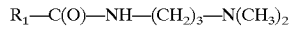

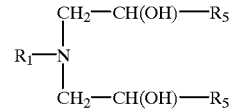

wherein $R_1$ is a $C_6$–$C_{12}$ alkyl group and $R_5$ is H or $CH_3$. Particularly preferred amines for use in the surfactants defined above include those selected from the group consisting of octyl amine, hexyl amine, decyl amine, dodecyl amine, $C_8$–$C_{12}$ bis(hydroxyethyl)amine, $C_8$–$C_{12}$ bis(hydroxyisopropyl)amine, $C_8$–$C_{12}$ amido-propyl dimethyl amine, or mixtures thereof.

In a highly preferred embodiment, the amine based surfactant is described by the formula:

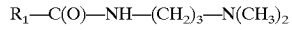

wherein $R_1$ is $C_8$–$C_{12}$ alkyl.

C) Detergent Builder

The detergent compositions herein may also comprise from about 0.1% to 80% by weight of a detergent builder. Preferably such compositions in liquid form will comprise from about 1% to 10% by weight of the builder component. Preferably such compositions in granular form will comprise from about 1% to 50% by weight of the builder component. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the oxydisuccinates and the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also discussed in U.S. Pat. No. 4,605,509 are crystalline layered silicates which are suitable for use in the detergent compositions of this invention.

D) Optional Detergent Ingredients

In addition to the surfactants, builders and amino acid based polymer, oligomer or copolymer materials hereinbefore described, the detergent compositions of the present invention can also include any number of additional optional ingredients. These include conventional detergent composition components such as enzymes and enzyme stabilizing agents, suds boosters or suds suppressers, anti-tarnish and anticorrosion agents, soil suspending agents, soil release agents, germicides, pH adjusting agents, non-builder alkalinity sources, chelating agents, organic and inorganic fillers, solvents, hydrotropes, optical brighteners, dyes and perfumes.

pH adjusting agents may be necessary in certain applications where the pH of the wash solution is greater than about 10.0 because the fabric integrity benefits of the defined compositions begin to diminish at a higher pH. Hence, if the wash solution is greater than about 10.0 after the addition of the amino acid based polymer, oligomer or copolymer materials of the present invention a pH adjuster should be used to reduce the pH of the washing solution to below about 10.0, preferably to a pH of below about 9.5 and most preferably below about 7.5. Suitable pH adjusters will be known to those skilled in the art.

Normally, a preferred optional ingredient for incorporation into detergent compositions is a bleaching agent, e.g., a peroxygen bleach. However, many common bleaching agents will degrade some, but not all, of the amino acid based fabric treatment materials of the present invention. Hence, before adding a bleaching agent to a detergent composition comprising an amino acid based fabric treatment material as defined herein compatibility between the bleaching agent and the amino acid based fabric treatment material must be investigated.

Another highly preferred optional ingredient in the detergent compositions herein is a detersive enzyme component. While it is known that some enzymes will degrade the peptide bonds of amino acids, the amino acid based polymer, oligomer or copolymer materials defined herein do not exhibit such degradation in the presence of enzymes. Hence, enzymes can be added to detergent compositions which comprise the amino acid based fabric treatment materials of the present invention with substantially no degradation.

Enzymes can be included in the present detergent compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability, optimal thermostability, and stability to active detergents, builders and the like. In this respect bacterial or fungal enzymes are preferred, such as acterial amylases and proteases, and fungal cellulases.

"Detersive enzyme", as used herein, means any enzyme having a cleaning, stain removing or otherwise beneficial effect in a laundry detergent composition. Preferred enzymes for laundry purposes include, but are not limited to, proteases, cellulases, lipases, amylases and peroxidases.

Enzymes are normally incorporated into detergent compositions at levels sufficient to provide a "cleaning-effective amount". The term "cleaning-effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may be desirable in highly concentrated detergent formulations.

Suitable examples of proteases are the subtilisins which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

Cellulases usable herein include both bacterial and fungal types, preferably having a pH optimum between 5 and 10. U.S. Pat. No. 4,435,307, Barbesgoard et al., Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, *Dolabella Auricula Solander*. Suitable cellulases are also disclosed in GB-A-2.075.028; GB-A-2.095.275 and DE-OS-2.247.832. CAREZYME® and CELLUZYME® (Novo) are especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also, the lipase in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum*, e.g. *Chromobacter viscosum var. lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPO-LASE® enzyme derived from *Humicola lanuginosa* and commercially available from Novo, see also EP 341,947, is a preferred lipase for use herein.

The enzyme-containing compositions herein may optionally also comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

E) Detergent Composition Preparation

The detergent compositions according to the present invention can be in liquid, paste or granular form. Such compositions can be prepared by combining the essential and optional components in the requisite concentrations in any suitable order and by any conventional means.

Granular compositions, for example, are generally made by combining base granule ingredients, e.g., surfactants, builders, water, etc., as a slurry, and spray drying the resulting slurry to a low level of residual moisture (5–12%). The remaining dry ingredients, e.g., granules of the essential amino acid based fabric treatment materials, can be admixed in granular powder form with the spray dried granules in a rotary mixing drum. The liquid ingredients, e.g., solutions of the essential amino acid based fabric treatment materials, enzymes, binders and perfumes, can be sprayed onto the resulting granules to form the finished detergent composition. Granular compositions according to the present invention can also be in "compact form", i.e. they may have a relatively higher density than conventional granular detergents, i.e. from 550 to 950 g/l. In such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt.

Liquid detergent compositions can be prepared by admixing the essential and optional ingredients thereof in any desired order to provide compositions containing components in the requisite concentrations. Liquid compositions according to the present invention can also be in "compact form", in such case, the liquid detergent compositions according to the present invention will contain a lower amount of water, compared to conventional liquid detergents. Addition of the amino acid based polymer, oligomer or copolymer materials to liquid detergent or other aqueous compositions of this invention may be accomplished by simply mixing into the liquid solutions the desired amino acid based fabric treatment materials.

F) Fabric Laundering Method

The present invention also provides a method for laundering fabrics in a manner which imparts fabric appearance benefits provided by the amino acid based polymer, oligomer or copolymer materials used herein. Such a method employs contacting these fabrics with an aqueous washing solution formed from an effective amount of the detergent compositions hereinbefore described or formed from the individual components of such compositions. Contacting of fabrics with washing solution will generally occur under conditions of agitation although the compositions of the present invention may also be used to form aqueous unagitated soaking solutions for fabric cleaning and treatment. As discussed above, it is preferred that the washing solution have a pH of less than about 10.0, preferably it has a pH of about 9.5 and most preferably it has a pH of about 7.5.

Agitation is preferably provided in a washing machine for good cleaning. Washing is referably followed by drying the wet fabric in a conventional clothes dryer. An effective amount of a high density liquid or granular detergent composition in the aqueous wash solution in the washing machine is preferably from about 500 to about 7000 ppm, more preferably from about 1000 to about 3000 ppm.

G) Fabric Conditioning

The amino acid based polymer, oligomer or copolymer materials hereinbefore described as components of the laundry detergent compositions herein may also be used to treat and condition fabrics and textiles in the absence of the surfactant and builder components of the detergent composition embodiments of this invention. Thus, for example, a fabric conditioning composition comprising only the amino acid based fabric treatment materials themselves, or comprising an aqueous solution of the amino acid based fabric treatment materials, may be added during the rinse cycle of a conventional home laundering operation in order to impart the desired fabric appearance and integrity benefits hereinbefore described.

EXAMPLES

The following examples illustrate the compositions and methods of the present invention, but are not necessarily meant to limit or otherwise define the scope of the invention.

Examples I–III illustrate possible synthesis methods for compositions of the present invention, other synthesis methods will be known to those skilled in the art.

Example I

A synthesis of a L-lysine:epsilon-caprolactam:propionic acid-polymer with molar ratios of 5:5:1 is as follows:

684 g of an 60% aqueous solution of L-lysine (365.2 g, 2.5 mol), epsilon-caprolactam (282.9 g, 2.5 mol), propionic acid (37.0 g, 0.5 mol) and sodium hypophosphite are placed in a 2 l reaction vessel equipped with an efficient stirrer and distillation head. The solution is heated under a constant stream of nitrogen to 170° C. for 1 hour as water distills from the reaction. Afterwards, a water pump vacuum is applied for 1 hour to remove residual amounts of solvent and volatile products. The reddish, slightly viscous melt is cooled to 125° C. and 620 g water are added slowly to result in a clear red solution. This solution is further cooled to room temperature and adjusted to a pH of approximately 7.5 with concentrated sulfuric acid (80 g) to form about a 50% stock solution. The molecular weight of the polymer is approximately 3550.

Example II

A synthesis of a L-lysine:adipic acid-polymer with a molar ratio of 5:1 is as follows:
L-lysine monohydrate (410.5 g, 2.5 mol), adipic acid (73.1 g, 0.5 mol) sodium hypophosphite (0.1 g) and water (176 g) are placed in a 2 l reaction vessel equipped with an efficient stirrer and distillation head. The solution is heated under a constant stream of nitrogen to 152° C. for 5 hours as water distills from the reaction. Following this, a water pump vacuum is applied for 1 hour to remove residual amounts of solvent and volatile products. The reddish, slightly viscous melt is cooled to 140° C. and 400 g water is added slowly to result in a clear red solution after 30 min. of stirring. This solution is further cooled to room temperature and adjusted to a pH of approximately 7.5 with concentrated sulfuric acid (72 g) to form about a 50% stock solution. The molecular weight of the polymer is approximately 2160.

Example III

A synthesis of a L-lysine:lauric acid-polymer with a molar ratio of 5:1 is as follows:
L-lysine monohydrate (365.2 g, 2.5 mol), lauric acid (100.16 g, 0.5 mol) sodium hypophosphite (0.1 g) and water (176 g) are placed in a 2 l reaction vessel equipped with an efficient stirrer and distillation head. The solution is heated under a constant stream of nitrogen to 160° C. for 5 hours as water distills from the reaction. Following this, a water pump vacuum is applied for 4 hours to remove residual amounts of the solvent and volatile products. The reddish, slightly viscous melt is cooled to 140° C. and 400 g water is added slowly to result in a clear red solution after 30 min. of stirring. This solution is further cooled to room temperature and adjusted to a pH of approximately 7.5 with concentrated sulfuric acid (72 g) to form about a 50% stock solution. The molecular weight of the polymer is approximately 3150.

Example IV

Condensation product of L-lysine:aminocaproic acid and adipic acid in a molar ratio of 10:10:1
684 g of a 60% aqueous solution of L-lysine (365.2 g, 2.5 mol), aminocaproic acid (327.9 g, 2.5 mol), adipic acid (36.5 g, 0.25 mol) and sodium hypophosphite (0.1 g) are placed in a pressurizable 2.5 l reaction vessel and blanketed with nitrogen. The reaction vessel is then sealed pressure tight and heated to 200° C. for 7 h, during which time the internal pressure rises to 6.6 bar. The reaction mixture is then cooled resulting in a yellow viscous solution with a solid content of approx. 66%. 200 g of this solution is subjected to a water pump vacuum for 2 h at a temperature of 170° C. to 180° C. to remove solvent and volatile products. The resulting red solid is dissolved in water and adjusted to a pH of approximately 7.5 with concentrated sulfuric acid to form an approx. 48.6% stock solution.

Example V

Condensation product of L-lysine:epsilon-caprolactam and proppionic acid in a molar ratio of 5:5:1
684 g of a 60% aqueous solution of L-lysine (365.2 g, 2.5 mol), epsilon-caprolactam (282.9 g, 2.5 mol), propionic acid (37.0 g, 0.5 mol) and sodium hypophosphite (0.1 g) are placed in a pressurizable 2.5 l reaction vessel and blanketed with nitrogen. The solution is heated to 160° C. as water (317 g) is distilled from the reaction mixture. The reaction vessel is then sealed pressure tight and heated to 200° C. for 4 h, during which time the internal pressure rises to 3.75 bar. The pressure is then slowly released to atmospheric pressure to remove water from the reaction mixture. Following this, a water pump vacuum is applied for 0.5 h to remove residual amounts of solvent and volatile products. The viscous melt is cooled to 125° C. and 620 g water are added slowly resulting in a clear red solution, which is further cooled to ambient temperature. 600 g of this solution is adjusted to a pH of approximately 7.5 with concentrated sulfuric acid to form an approx. 53.0% stock solution. The molecular weight of the polymer is determined to be Mw=4090 g mol-l.

Example VI

Condensation product of L-lysine:epsilon-caprolactam and $C_{14}/C_{16}$-alkyldiketene in a molar ration of 10:10:1
L-lysine monohydrate (821 g, 5 mol), epsilon-caprolactam (565.8 g, 5 mol) and sodium hypophosphite (0.1 g) are placed in a pressurizable 2.5 l reaction vessel and blanketed with nitrogen. The solution is heated to 192° C. for approx. 1 h as water is distilled from the reaction mixture. The reaction vessel is then sealed pressure tight and heated to 200° C. for 7 h, during which time the internal pressure rises to 7.25 bar. The pressure is then slowly released to atmospheric pressure to remove solvent and volatile products from the reaction mixture. Subsequently, $C_{14}/C_{16}$-alkyldiketene (50.4 gm 0.5 mol) is slowly added to the reaction mixture and heating is continued for 2 h under a constant stream of nitrogen. The melt is cooled to 100° C. and 1200 g water is added slowly to result in a brownish, viscous suspension which is cooled to ambient temperature. 200 g of this material is adjusted to a pH of approximately 7.5 with citric acid to form a suspension with a solid content of approx. 40.6%.

Example VII

Granular Detergent Test Composition Preparation

Several granular detergent compositions are prepared containing various amino acid based polymer, oligomer or copolymer materials. Such granular detergent compositions all have the following basic formula:

TABLE VII

| Component | Wt. % |
| --- | --- |
| $C_{12}$ Linear alkyl benzene sulfonate | 9 |
| $C_{14-15}$ alkyl sulfonate | 13 |
| Zeolite Builder | 28 |
| Sodium Carbonate | 27 |
| PEG 4000 | 1.6 |
| Dispersant | 2.3 |
| $C_{12-13}$ alkyl ethoxylate (E9) | 1.5 |
| Sodium Perborate | 1.0 |
| Soil Release Polymer | 0.4 |
| Enzymes | 0.6 |
| Amino Acid Based Fabric Treatment Materials as shown in Table IX | 1.2 |
| Perfume, Brightener, Suds Suppressor, Other Minors, Moisture, Sulfate | Balance |
| | 100% |

Example VIII

Liquid Detergent Test Composition Preparation

Several heavy duty liquid detergent compositions are prepared containing various amino acid based polymer, oligomer or copolymer materials as described in claim 1. Such liquid detergent compositions all have the following basic formula:

TABLE VIII

| Component | Wt. % |
|---|---|
| $C_{12-15}$ alkyl ether (2.5) sulfate | 19 |
| $C_{12-13}$ alkyl ethoxylate (9.0) | 2 |
| $C_{12-14}$ glucose amide | 3.5 |
| Citric Acid | 3 |
| $C_{12-14}$ Fatty Acid | 2 |
| MEA | to pH 8 |
| Ethanol | 3.4 |
| Propanediol | 6.5 |
| Borax | 2.5 |
| Dispersant | 1.2 |
| Na Toluene Sulfonate | 2.5 |
| Amino Acid Based Fabric Treatment Materials as shown in Table IX | 0.8 |
| Dye, Perfume, Brighteners, Enzymes, Preservatives, Suds Suppressor, Other Minors, Water | Balance |
| | 100% |

Example IX

Comparative Tests

Detergent compositions comprising various lysine based polymer materials are prepared according to Tables VII and VIII above, and then evaluated for any effects caused by the various amino acid based polymers listed in Table IX. The detergent compositions are evaluated by washing samples of fabrics or garments using the test compositions, and comparing the samples to control samples laundered with compositions comprising no polymer, all other test conditions are identical.

Overall Appearance

In an Overall Appearance test, fabrics are washed using various test compositions containing either no lysine/carboxylic acid polymers (control) or one of the polmers defined in Table IX below. The fabrics are washed and after ten cycles are then comparatively graded by three judges who evaluate the overall appearance of the washed fabrics. It is the decision of the judge as to what is to be evaluated unless specific direction is given to evaluate one attribute such as color, pilling, fuzz, etc.

In the Overall Appearance test, the visual preference of the judge is expressed using the Scheff scale.
That is:
- 0=No difference
- 1=I think this one is better (unsure).
- 2=I know this one is a little better.
- 3=I know this one is a lot better.
- 4=I know this one is a whole lot better.

For the Overall Appearance test, laundering conditions are as follows:
- Washer Type: Kenmore (17 gallons)
- Wash Time: 12 min
- Wash Temperature: 90° F. (32.2° C.)
- Wash Water Hardness: 6 grains per gallon
- Washer Agitation: normal
- Rinse Time: 2 min
- Rinse Temperature: 60° F. (15.6° C.)
- Rinse Water Hardness: 6 grains per gallon
- Wash Load Fabric Content: various colored and white garments and fabrics
- Wash Load Weight: 5.5 lbs (2.5 kg)

The average overall appearance test results are shown in Table IX.

TABLE IX

Lysine/carboxylic acid examples

| Molecule | Fabric | FI Benefit (PSU) |
|---|---|---|
| Lysine/aminocaproic acid 1:1 | CLOTH A | 1.3 |
| | Olive T-shirt | 1.7 |
| Lysine/caprolactam 1:1 | CLOTH C | 1.5 |
| | Burgundy Flannel | 1.2 |
| | Green Flannel | 1.3 |
| Lysine/palmitic acid 10:1 | Black socks | 1.5 |
| | Burgundy Flannel | 1.2 |
| Lysine/stearic acid 10:1 | Black socks | 1.7 |
| | CLOTH B | 1.2 |
| | CLOTH C | 1.0 |
| | Burgundy flannel | 1.3 |
| | Green flannel | 1.3 |
| Lysine/acetic acid 10:1 | CLOTH B | 2.0 |
| Lysine/acetic acid 5:1 | CLOTH B | 1.8 |
| | CLOTH C | 1.5 |
| Lysine/aminocaproic acid/acetic acid 5:5:2 | Green Flannel | 1.3 |
| Lysine/propionic acid 5:1 | CLOTH C | 1.3 |
| | Green Flannel | 1.0 |
| | CLOTH B | 1.7 |
| Lysine/caprolactam/propionic acid 10:5:1 | CLOTH B | 1.7 |
| Lysine/caprolactam/propionic acid 5:5:1 | Black sock | 1.8 |
| Lysine/aminocaproic acid/propionic acid 5:5:2 | Burgundy flannel | 1.3 |
| Lysine/lauric acid 10:1 | Black sock | 2.0 |
| | CLOTH B | 1.3 |
| | CLOTH C | 2.3 |
| | Burgundy Flannel | 1.2 |
| Lysine/lauric acid 5:1 | CLOTH B | 1.7 |
| | CLOTH C | 2.5 |
| | Burgundy Flannel | 1.5 |
| Lysine/lauric acid 4:1 | CLOTH C | 1.5 |
| | CLOTH A | 1.0 |
| Lysine/lauric acid 3:1 | CLOTH B | 1.7 |
| | Burgundy Flannel | 1.3 |
| Lysine/aminocaproic acid/lauric acid 5:3:1 | CLOTH C | 1.0 |
| Lysine/2-ethylhexanoic acid 5:1 | CLOTH B | 1.2 |
| | CLOTH C | 1.5 |
| | Green Flannel | 1.7 |
| Lysine/aminocaproic acid/2-ethylhexanoic acid 5:3:1 | CLOTH B | 2.0 |
| | CLOTH C | 2.0 |
| Lysine/octanoic acid 5:1 | Black sock | 1.3 |
| | CLOTH B | 1.2 |
| | CLOTH A | 1.2 |
| | CLOTH C | 1.7 |
| Lysine/adipic acid 10:1 | CLOTH B | 2.0 |
| | CLOTH C | 1.5 |
| Lysine/adipic acid 5:1 | CLOTH B | 1.8 |
| | CLOTH A | 1.5 |
| Lysine/aminocaproic acid/adipic acid 5:5:1 | Olive T-shirt | 1.1 |

CLOTH A, CLOTH B and CLOTH C indicate cotton weave fabrics that were dyed with the commercially available dyes listed below. For the tests reported in Table IX, fabrics CLOTH A, CLOTH B and CLOTH C were purchased from the Imperical Manufacturing Company, who dyed the fabrics with the following dyes:
CLOTH A=Direct Blue 1;
CLOTH B=Direct Black 112; and
CLOTH C=Direct Violet 47.

What is claimed is:
1. A detergent composition comprising:
   a) from about 1% to about 80% by weight of surfactants selected from the group consisting of nonionic, anionic, cationic, amphoteric, or zwitterionic surfactants, or mixtures thereof; and
   b) from about 0.1% to about 10%, by weight of a mixture of amino acid based polymers, oligomers or copolymers of the general formula:

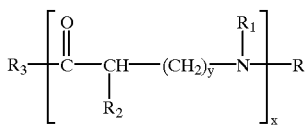

wherein the polymer, oligomer, or copolymer contains at least about 5 mole %, of one or more basic amino acids, and wherein the polymer, oligomer, or copolymer is a condensate of lysine with at least one compound selected from the group consisting of aminocaproic acid, caprolactam, 2-ethylhexanoic acid, adipic acid, phthalic acid, terephthalic acid, oxalic acid, citric acid, $C_1$–$C_{30}$ alkyldiketenes, $C_1$–$C_{30}$ monocarboxylic acids that are linear or branched, saturated or unsaturated, and mixtures thereof;

each $R_1$ is independently selected from the group consisting of H, —C(O)—$R_4$, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl, $C_7$–$C_{18}$ alkylaryl, citric acid,

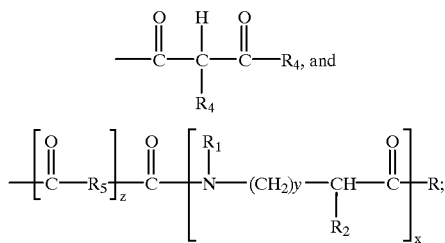

each $R_2$ is independently selected from the group consisting of H, $NH_2$,

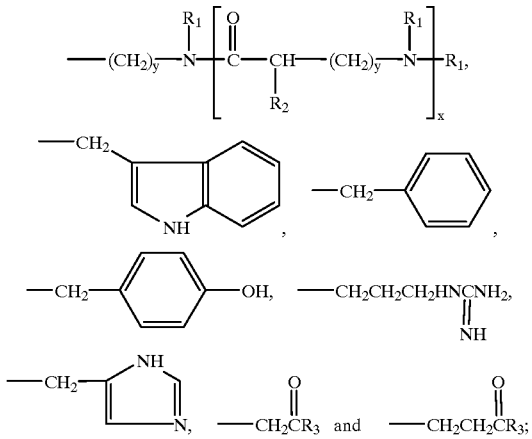

each $R_3$ is independently selected from the group consisting of OH, OM,

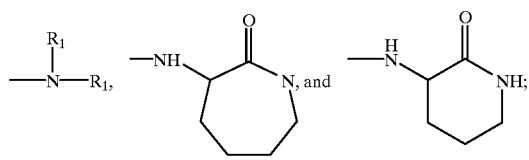

each $R_4$ is independently selected from the group consisting of $C_1$–$C_{30}$ saturated or unsaturated, branched or linear alkyl, $C_3$–$C_8$ cycloalkyl, $C_2$–$C_{30}$ hydroxyalkyl, $C_6$–$C_{18}$ aryl, $C_7$–$C_{30}$ alkylaryl, and $C_2$–$C_{100}$ linear or branched oxa or polyoxa-substituted alkyl;

$R_5$ may be absent, if $R_5$ is present each $R_5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, and $C_3$–$C_{12}$ cyclic oxa-substituted alkylene;

wherein:

each x is independently from 0 to about 200;

each y is independently from 0 to about 10;

each z is independently 0 or 1; and

M is selected from compatible cations; and provided that:

the sum of all x's is from 2 to about 200;

any basic amine site on the polymer, oligomer, or copolymer may be optionally protonated, alkylated, or quaternized with constituents selected from the group consisting of H, $CH_3$, alkyl, hydroxyalkyl, benzyl and mixtures thereof;

any amine site may be optionally alkoxylated; and when two $R_1$ groups are attached to a common nitrogen the two $R_1$s may form a cyclic structure selected from the group consisting of $C_5$–$C_8$ alkylene, and $C_4$-$C_7$ alkyleneoxyalkylene.

2. A detergent composition according to claim 1, wherein the amino acid based polymer, oligomer or copolymer is a condensate of lysine with at least two compounds selected from the group consisting of aminocaproic acid, caprolactam, 2-ethylhexanoic acid, adipic acid, phthalic acid, terephthalic acid, oxalic acid, citric acid, $C_1$–$C_{30}$ alkyldiketenes, $C_1$–$C_{30}$ monocarboxylic acids that are linear or branched, saturated or unsaturated, and mixtures thereof.

3. A detergent composition according to claim 1, wherein the lysine and the compund are condensed at a ratio of lysine:acid of from about 1:1 to about 10:1.

4. A laundry additive composition comprising:
a) from about 1% to about 80% by weight of water; and
b) from about 0.1% to about 50.0% by weight of a mixture of amino acid based polymers, oligomers or copolymers of the general formula:

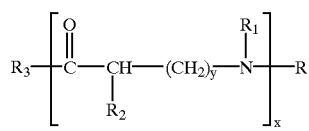

wherein the polymer, oligomer, or copolymer contains at least about 5 mole %, of one or more basic amino acids, and wherein the polymer, oligomer, or copolymer is a condensate of lysine with at least one compound selected from the group consisting of aminocaproic acid, caprolactam, 2-ethylhexanoic acid, adipic acid, phthalic acid, terephthalic acid, oxalic acid, citric acid, $C_1$–$C_{30}$ alkyldiketenes, $C_1$–$C_{30}$ monocarboxylic acids that are linear or branched, saturated or unsaturated, and mixtures thereof, each $R_1$ is independently selected from the group consisting of H, —C(O)—$R_4$, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl, $C_7$–$C_{18}$ alkylaryl, citric acid,

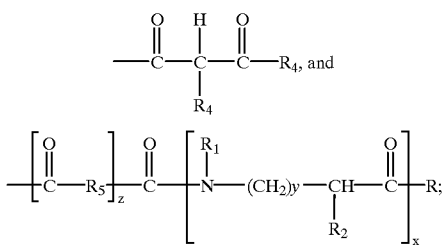

each R₂ is independently selected from the group consisting of H, $NH_2$,

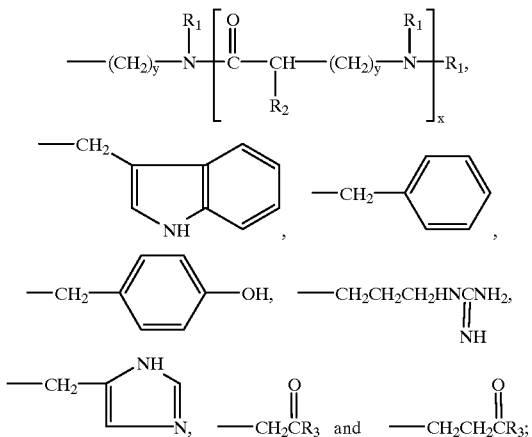

each R₃ is independently selected from the group consisting of OH, OM,

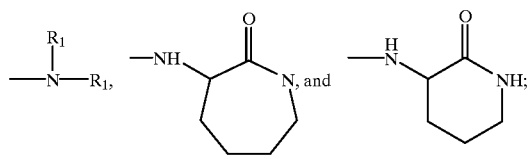

each R₄ is independently selected from the group consisting of $C_1$–$C_{30}$ saturated or unsaturated, branched or linear alkyl, $C_3$–$C_8$ cycloalkyl, $C_2$–$C_{30}$ hydroxyalkyl, $C_6$–$C_{18}$ aryl, $C_7$–$C_{30}$ alkylaryl, and $C_2$–$C_{100}$ linear or branched oxa or polyoxa-substituted alkyl;

R₅ may be absent, if R₅ is present each R₅ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, and $C_3$–$C_{12}$ cyclic oxa-substituted alkylene; wherein:

each x is independently from 0 to about 200;
each y is independently from 0 to about 10;
each z is independently 0 or 1; and
M is selected from compatible cations; and
provided that:
the sum of all x's is from 2 to about 200;
any basic amine site on the polymer, oligomer, or copolymer may be optionally protonated, alkylated, or quaternized with constituents selected from the group consisting of H, $CH_3$, alkyl, hydroxyalkyl, benzyl and mixtures thereof;
any amine site may be optionally alkoxylated; and when two R₁ groups are attached to a common nitrogen the two R₁s may form a cyclic structure selected from the group consisting of $C_5$–$C_8$ alkylene, and $C_4$–$C_7$ alkyleneoxyalkylene.

5. A detergent composition comprising:
a) from about 1% to about 80% by weight of surfactants selected from the group consisting of nonionic, anionic, cationic, amphoteric, or zwitterionic surfactants, or mixtures thereof; and
b) from about 0.1% to about 10%, by weight of a mixture of amino acid based polymers which are obtainable by condensing at a temperature of at least 120° C.:
(i) a basic amino acid selected from the group consisting of lysine, arginine, ornithine, tryptophane and mixtures thereof;
(ii) a copolymerizable compound selected from the group consisting of saturated monobasic carboxylic acids, unsaturated monobasic carboxylic acids, polybasic carboxylic acids, carboxylic acid anhydrides, diketenes, monohydroxycarboxylic acids, monobasic polyhydroxycarboxylic acids and mixtures thereof; and
(iii) optionally, at least one compound selected from the group consisting of amines, lactams, nonproteinogenic acids, alcohols, alkoxylated amines, amino sugars, carbohydrates, sugar carboxylic acids and mixtures thereof; and
wherein compounds (i) and (ii) are present in a molar ratio of (i):(ii) of from 100:1 to 1:1.

6. The detergent composition according to claim 5, wherein the molar ratio of basic amino acid (i) to copolymerizable compound (ii) is of from 100:1 to 2:1.

7. The detergent composition according to claim 5, wherein the molar ratio of basic amino acid (i) to copolymerizable compound (ii) is of from 50:1 to 2:1.

8. The detergent composition according to claim 5, werein the molar ratio of basic amino acid (i) to copolymerizable compound (ii) is of from 20:1 to 5:1.

9. The detergent composition according to claim 5, wherein the molar ratio of (i):(iii) is from 100:1 to 1:20.

10. The detergent composition according to claim 5, wherein the amino acid based polymers are obtained by condensing:
(i) lysine; and
(ii) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof.

11. The detergent composition according to claim 5, wherein the amino acid based polymers are obtained by condensing:
(i) a basic amino acid selected from the group consisting of lysine, arginine, ornithine, tryptophane and mixtures thereof;
(ii) at least one compound selected from the group consisting of saturated carboxylic acids, unsaturated carboxylic acids, polybasic carboxylic acids, carboxylic acid anhydrides, hydroxycarbxoylic acids, monobasic polyhydroxycarboxylic acids and mixtures thereof; and
(iii) at least one compound selected from the group consisting of amines, lactams having 5 to 13 atoms in the ring, non-proteinogenic aminocarbxoylic acids, alcohols, alkoxylated amines, amino sugars, carbohydrates, sugar carboxylic acids and mixtures thereof; and wherein compounds (i):(ii) are present in a molar ratio of (i):(ii) of from 100:1 to 2:1 and
wherein compounds (i):(iii) are present in a molar ratio of (i):(iii) of from 20:1 to 1:20.

12. The detergent composition according to claim 5, wherein the amino acid based polymers are obtained by condensing:
   (i) lysine;
   (ii) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof; and
   (iii) at least one compound selected from the group consisting of epsilon-caprolactam, laurolactam, aminocaproic acid, aminolauric acid and mixtures thereof; and
wherein compounds (i):(ii) are present in a molar ratio of (i):(ii) of from 100:1 to 2:1 and
wherein compounds (i):(iii) are present in a molar ratio of (i):(iii) of from 10:1 to 1:10.

13. The detergent composition according to claim 5, wherein the amino acid based polymers are obtained by condensing:
   (i) a basic amino acid selected from the group consisting of lysine, arginine, ornithine, tryptophane, and mixtures thereof;
   (ii) at least one alkyldiketene having 1 to 30 carbon atoms in the alkyl group; and
   (iii) optionally, at least one compound selected from the group consisting of amines, lactams, nonproteinogenic amino acids, alcohols, alkoxylated amines, amino sugars, carbohydrates, sugar carboxylic acid, and mixtures thereof.

14. A detergent composition comprising:
   a) from about 1% to about 80% by weight of surfactants selected from the group consisting of nonionic, anionic, cationic, amphoteric, or zwitterionic surfactants, or mixtures thereof; and
   b) from about 0.1% to about 10%, by weight of a mixture of amino acid based polymers, oligomers or copolymers of the general formula:

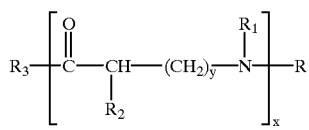

wherein the polymer, oligomer, or copolymer contains at least about 5 mole %, of one or more basic amino acids, and wherein the polymer, oligomer, or copolymer is a condensate of lysine with at least one compound selected from the group consisting of aminocaproic acid, caprolactam, 2-ethylhexanoic acid, adipic acid, phthalic acid, terephthalic acid, oxalic acid, citric acid, $C_1$–$C_{30}$ alkyldiketenes, $C_1$–$C_{30}$ monocarboxylic acids that are linear or branched, saturated or unsaturated, and mixtures thereof;
each $R_1$ is independently selected from the group consisting of H, —C(O)—$R_4$, $C_1$–$C_{18}$ saturated or unsaturated, branched or linear alkyl,

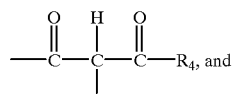

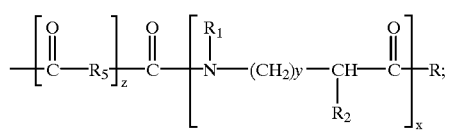

each $R_2$ is independently selected from the group consisting of H, $NH_2$,

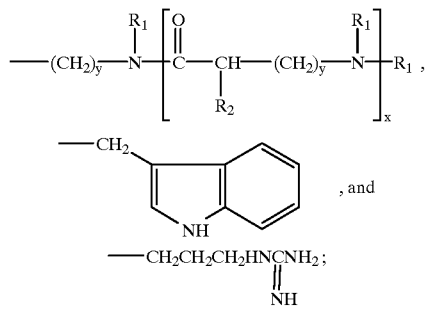

each $R_3$ is independently selected from the group consisting of OH, OM,

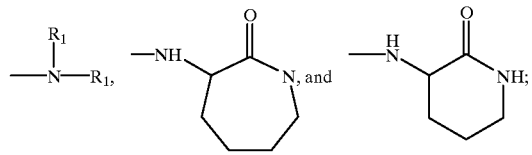

each $R_4$ is independently selected from the group consisting of $C_1$–$C_{30}$ saturated or unsaturated, branched or linear alkyl, $C_2$–$C_{30}$ hydroxyalkyl, $C_6$–$C_{18}$ aryl, and $C_7$–$C_{30}$ alkylaryl;
$R_5$ may be absent, if $R_5$ is present each $R_5$ is independently selected from the group consisting of $C_1$–$C_{12}$ linear or branched alkylene, and cyclic alkylene;
wherein:
   each x is independently from 0 to about 200;
   each y is independently from 0 to about 10;
   each z is independently 0 or 1; and
   M is selected from compatible cations; and
provided that:
   the sum of all x's is from 2 to about 200;
   any basic amine site on the polymer, oligomer, or copolymer may be optionally protonated, alkylated, or quaternized with constituents selected from the group consisting of H, $CH_3$, alkyl, hydroxyalkyl, benzyl and mixtures thereof;
   any amine site may be optionally alkoxylated; and
   when two $R_1$ groups are attached to a common nitrogen the two $R_1$s may form a cyclic structure selected from the group consisting of $C_5$–$C_8$ alkylene, and $C_4$–$C_7$ alkyleneoxyalkylene.

* * * * *